(12) United States Patent
Gaither et al.

(10) Patent No.: US 7,266,624 B1
(45) Date of Patent: Sep. 4, 2007

(54) PROGRAMMABLE LAYERED SUB-SYSTEM INTERFACE

(75) Inventors: Justin L. Gaither, Austin, TX (US); Amjad Odet-Allah, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 1098 days.

(21) Appl. No.: 10/177,449

(22) Filed: Jun. 20, 2002

(51) Int. Cl.
    *G06F 13/12* (2006.01)
(52) U.S. Cl. .................. 710/71; 709/250; 370/518
(58) Field of Classification Search ............. 710/71; 709/250; 370/518
    See application file for complete search history.

(56) References Cited

U.S. PATENT DOCUMENTS

| | | | |
|---|---|---|---|
| 6,826,658 B1 * | 11/2004 | Gaither et al. ............... | 711/150 |
| 6,862,293 B2 * | 3/2005 | Lay et al. .................... | 370/420 |
| 2002/0105966 A1 * | 8/2002 | Patel et al. .................. | 370/463 |
| 2003/0033399 A1 * | 2/2003 | Garnett et al. ............... | 709/223 |
| 2003/0058894 A1 * | 3/2003 | Feuerstraeter et al. ...... | 370/518 |
| 2003/0193962 A1 * | 10/2003 | Primrose et al. ............ | 370/411 |
| 2003/0217215 A1 * | 11/2003 | Taborek et al. ............. | 710/305 |

\* cited by examiner

*Primary Examiner*—Donald Sparks
*Assistant Examiner*—Ernest Unelus
(74) *Attorney, Agent, or Firm*—Timothy W. Markison; Michael Wallace; Michael R. Hardaway

(57) ABSTRACT

A programmable layered sub-system interface includes an extension sub-layer module, a physical coding sub-layer module, a physical media attachment module, an input module, an output module, a $1^{st}$ switch module and a $2^{nd}$ switch module. The $1^{st}$ switch module is coupled between the physical media attachment module and the physical coding sub-layer module. The $2^{nd}$ switch module is operably coupled between the physical coding sub-layer module and the extension sub-layer module. The input and output modules are operably coupled to the $1^{st}$ and $2^{nd}$ switch modules. The $1^{st}$ switch module provides various combinations of coupling between the physical media attachment module, the physical coding sub-layer module, the input module and the output module. The $2^{nd}$ switch module provides combinations of coupling between the extension sub-layer module, the physical coding sub-layer module, the input module and the output module.

25 Claims, 7 Drawing Sheets programmable layered subsystem interface 10 input module 56 output module 58 programmable layered subsystem interface 70

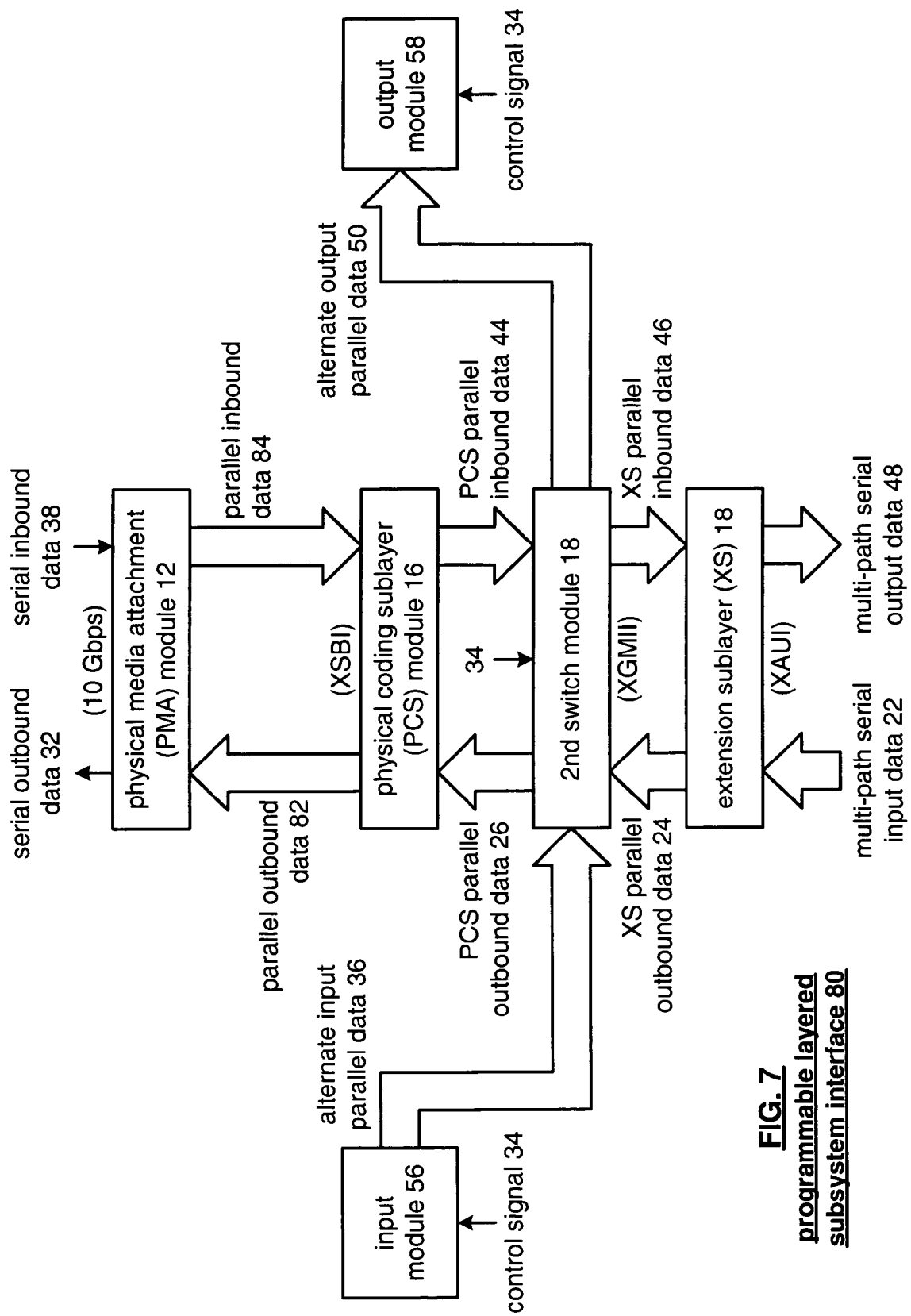
FIG. 7 programmable layered subsystem interface 80

PROGRAMMABLE LAYERED SUB-SYSTEM INTERFACE

BACKGROUND OF THE INVENTION

1. Technical Field of the Invention

This invention relates generally to communication systems and more particularly to data transfers within such systems.

2. Description of Related Art

Today's digital world is comprised of a continuous series of digital data transfers. Electronic equipment from toasters to computers, from coffee makers to satellite equipment, from televisions to Internet and/or telephone infrastructure equipment, et cetera, communicate (i.e., transmit and/or receive) digital data as their primary function or as part of their service. In any event, almost every piece of electronic equipment built today transmits and/or receives digital data, which may be digitized audio, digitized video and/or digitized alpha numeric information (i.e., text).

Depending on the type of electronic equipment, speed of the data transfer is of little importance or of great importance. For example, in computers, computer networks, telecommunication equipment, Internet equipment, local area network equipment, wide area network equipment, etc. speed of data transfers is of great importance since the faster the data can be transferred, the more users and/or features the system can support.

As is known, data transfers may occur through the air as RF transmissions, over twisted copper wires, over coaxial cables, and/or over fiber optic lines. As is further known, data may be transmitted in a serial manner, in a parallel manner, or in a parallel/serial manner over any of these data transmission mediums. Many standards have been generated to prescribe the manner in which data is transmitted over the various data transition mediums. For example, there are many versions of Ethernet, each of which prescribe a data rate, a serial/parallel transmission format, et cetera. Other standards, such as SONET, also prescribe various data rates and/or various serial/parallel data transmission formats.

As is further known, integrated circuits (IC) are typically used to provide an electrical device (e.g., computer, Internet equipment, telecommunication equipment, et cetera) with the appropriate interface (i.e., standard compliant data transfer circuitry). Such an integrated circuit is generally referred to as an Application Specific Integrated Circuit (ASIC). As is further known, ASICs are designed and fabricated to perform a specific function or functions of an application (e.g., perform functions relating to a particular data transfer protocol), but have little utility outside the particular application. As such, for different applications, different ASICs are needed. As is also known, the design and fabrication of an ASIC is very expensive and time consuming.

Therefore, a need exists for a data transfer interface that is especially useful for multiple high-speed serial/de-serial interfaces.

BRIEF SUMMARY OF THE INVENTION

The programmable layered sub-system interface of the present invention substantially meets these needs and others. One embodiment of a programmable layered sub-system interface includes an extension sub-layer module, a physical coding sub-layer module, a physical media attachment module, an input module, an output module, a $1^{st}$ switch module and a $2^{nd}$ switch module. The $1^{st}$ switch module is operably coupled between the physical media attachment module and the physical coding sub-layer module. The $2^{nd}$ switch module is operably coupled between the physical coding sub-layer module and the extension sub-layer module. The input and output modules are operably coupled to the $1^{st}$ and $2^{nd}$ switch modules.

The $1^{st}$ switch module provides various combinations of coupling between the physical media attachment module, the physical coding sub-layer module, the input module and the output module. For example, the $1^{st}$ switch module may be configured, based on a control signal, to provide alternate input parallel data, which is received via the input module, to the physical media attachment module or to the physical coding sub-layer module. When the $1^{st}$ switch module is providing the alternate input parallel data to the physical media attachment module, the $1^{st}$ switch module is coupled to provide the parallel output data from the physical media attachment module to the output module as alternate input parallel data. The $1^{st}$ switching module, when providing the alternate input parallel data to the physical coding sub-layer module, is also configured to provide the parallel outbound data produced by the physical coding layer to the output module as alternate output parallel data. The $1^{st}$ switching module may also be configured to provide loop-back coupling for the physical media attachment module and/or for the physical coding sub-layer module. In addition, the $1^{st}$ switching module may provide coupling between the physical coding sub-layer module and the physical media attachment module.

The $2^{nd}$ switch module provides similar functionality as the $1^{st}$ switch module but for the physical coding sub-layer module and the extension sub-layer module. In other embodiments of the programmable layered sub-system interface of the present invention, the $1^{st}$ or $2^{nd}$ switching module may be omitted. By incorporating the $1^{st}$ switching module, and/or the $2^{nd}$ switching module, the input module, and the output module within a sub-system interface, a single device or single integrated circuit may fulfill multiple interfacing applications. For example, such multiple applications include providing interface for XAUI (10 Gigabit Attachment Unit Interface) to 10 Gbps serial, XGMII (10 Gigabit Media Independent Interface) to 10 Gbps serial, XSBI (10G SB Interface) to 10 Gbps serial, XAUI to XSBI, and XAUI to XGMII. In addition, the programmable layered sub-system interface of the present invention allows monitoring of the data as it propagates through the interface, which allows for in-system diagnostics and/or tapping.

BRIEF DESCRIPTION OF THE SEVERAL VIEWS OF THE DRAWINGS

FIG. 7 is a schematic block diagram of another alternate embodiment of a programmable layered sub-system interface in accordance with the present invention.

DETAILED DESCRIPTION OF THE INVENTION

Figure 1:
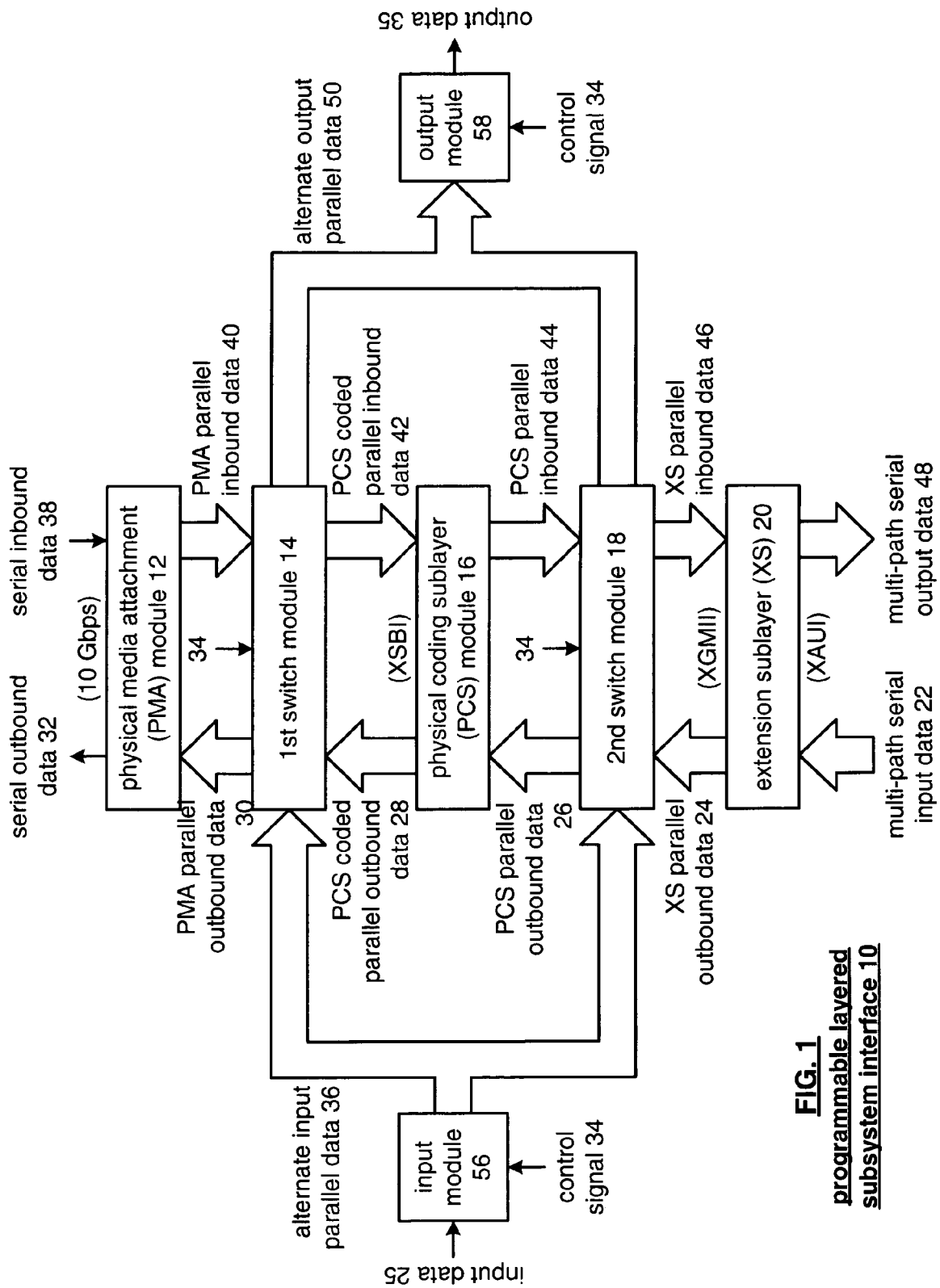
FIG. 1 is a schematic block diagram of a programmable layered sub-system interface in accordance with the present invention.

FIG. 1 illustrates a programmable layered sub-system interface 10 that includes a physical media attachment (PMA) module 12, a 1$^{st}$ switching module 14, a physical coding sub-layer (PCS) module 16, a 2$^{nd}$ switch module 18, an extension sub-layer (XS) module 20, an input module 56 and an output module 58. As shown, the 1$^{st}$ switching module 14 is coupled to the PMA module 12, the PCS module 16, the input module 56, and the output module 58. The 2$^{nd}$ switch module 18 is operably coupled to the PCS module 16, the XS module 20, the input module 56, and the output module 58. In general, the PMA module transceives 10.3125 Gbps serial data, the data between the PMA module 12 and PCS module 16 is formatted in accordance with XSBI, the data between the PCS module 16 and XS module 20 is formatted in accordance with XGMII, and the data inputted and outputted from the XS module 20 is formatted in accordance with XAUI. With the 1$^{st}$ and 2$^{nd}$ switching modules positioned as shown, the programmable layered sub-system interface 10 may be configured to provide interfacing for XAUI to 10 Gbps serial, XGMII to 10 Gbps serial, XSBI to 10 Gbps serial, XAUI to XSBI, and XAUI to XGMII. In addition, the 1$^{st}$ and 2$^{nd}$ switching modules may be configured to provide a loop-back coupling for the PMA module 12, the PCS module 16, and the XS module 20.

Figure 4:
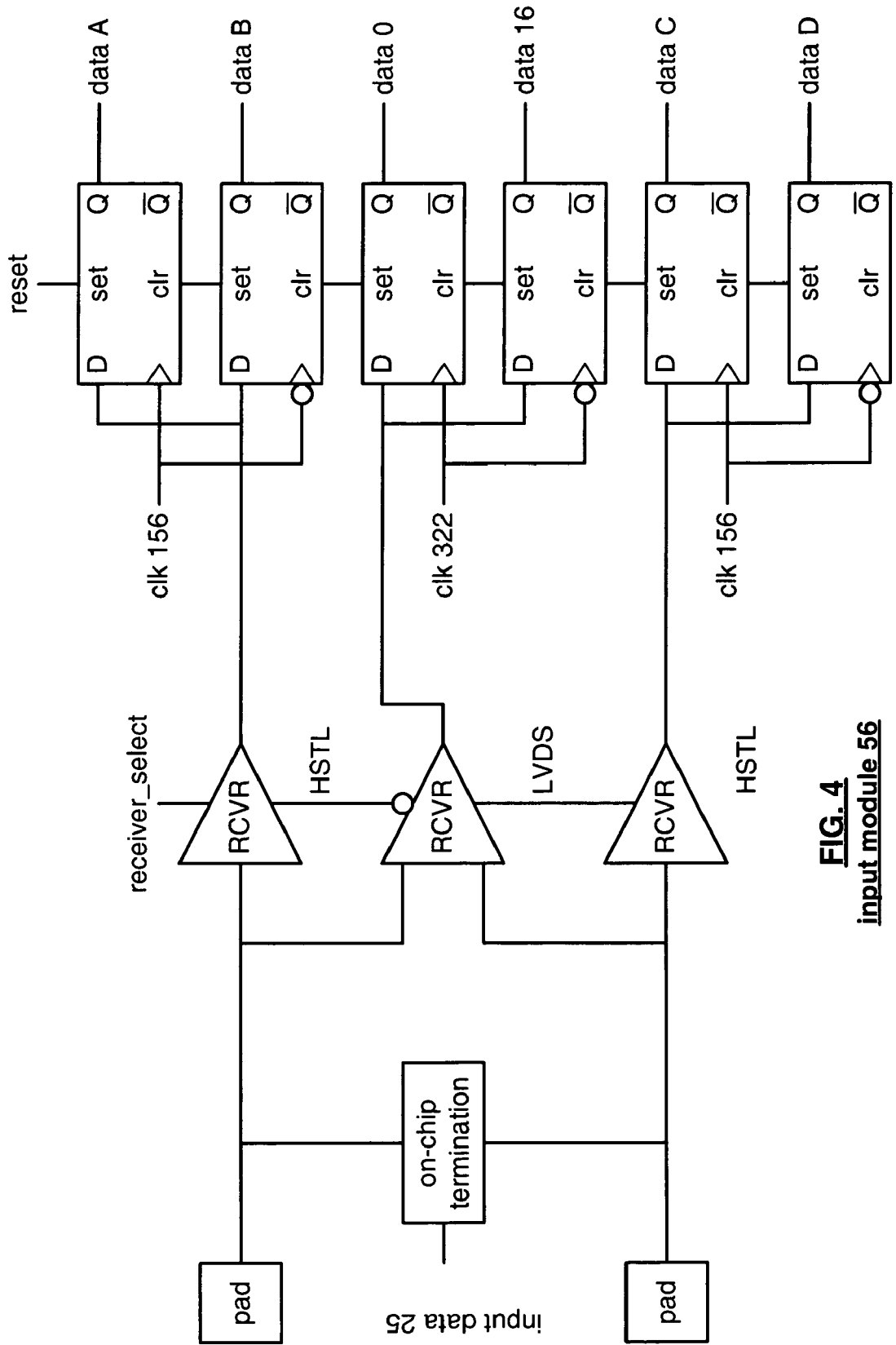
FIG. 4 is a schematic block diagram of an input module in accordance with the present invention.

The input module 56, which will be described in greater detail with reference to FIG. 4, provides input data 25 as alternate input parallel data 36 to either the 1$^{st}$ switch module 14 or the 2$^{nd}$ switch module 18, based on control signal 34. When the input module 56 is providing the alternate input parallel data 36 to the 1$^{st}$ switch module 14 it is formatted in accordance with a proprietary interface protocol (as illustrated in FIG. 4) to support XSBI. Alternatively, when the input module 56 is providing the alternative input parallel data 36 to the 2$^{nd}$ switch module 18, it is formatted in accordance with the proprietary interface protocol (as illustrated in FIG. 4) to support XGMII.

Figure 5:
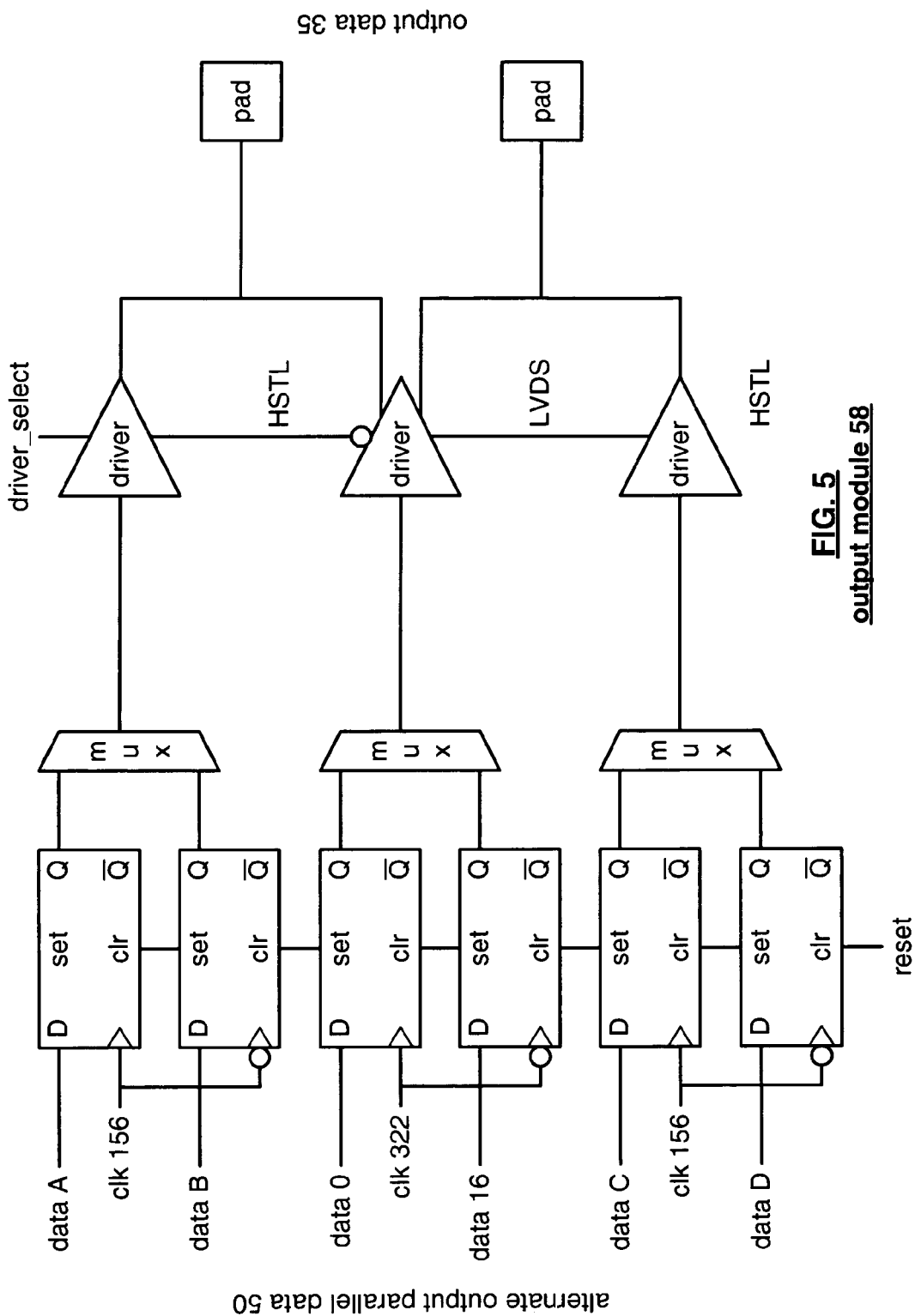
FIG. 5 is a schematic block diagram of an output module in accordance with the present invention.

The output module 58, which will be described in greater detail with reference to FIG. 5, receives alternate output parallel data 50 from either the 1$^{st}$ switch module 14 or the 2$^{nd}$ switch module 18 based on the control signal 34 and produces output data 35. When the alternate output parallel data 50 is received from the 1$^{st}$ switch module 14, it is formatted in accordance with the proprietary interface protocol (as illustrated in FIG. 5) to support XSBI. When the output module 58 receives the alternate output parallel data 50 from the 2$^{nd}$ switch module 18, it is formatted in accordance with the proprietary interface protocol (as illustrated in FIG. 5) to support XGMII.

The PMA module 12, which may be constructed to operate in accordance with the IEEE 802.3ae standard, converts serial inbound data 38 into PMA parallel inbound data 40, which may be formatted in accordance with XSBI. The PMA module 12 also converts PMA parallel outbound data 30, which may be formatted in accordance with XSBI, into serial outbound data 32. The serial outbound data 32 and serial inbound data 38 may be single transmission paths operating at 10.3125 gigabits-per-second.

The PCS module 16, which may be constructed to operate in accordance with the IEEE 802.3ae standard, converts PCS coded parallel inbound data 42, which is formatted in accordance with XSBI, into PCS parallel inbound data 44, which is formatted in accordance with XGMII. The PCS module 16 is also coupled to convert PCS parallel outbound data 26, which is formatted in accordance with XGMII, into PCS coded parallel outbound data 28, which is formatted in accordance with XSBI.

The XS module 20, which may include a serial/de-serial interface (XAUI) module and a 2$^{nd}$ PCS module, is configured to operate in accordance with the IEEE 802.3ae standard. In addition, the XS module 20 is operably coupled to convert XS parallel inbound data 46, which is formatted in accordance with XGMII, into multi-path serial output data 48, which is formatted in accordance with XAUI. The XS module 20 is also coupled to convert multi-path serial input data 22, which is formatted in accordance with XAUI, into XS parallel outbound data 24, which is formatted in accordance with XGMII.

Based on the control signal 34, the programmable layered sub-system interface 10 may provide XAUI to 10 Gbps serial interfacing, XGMII to 10 Gbps serial interfacing, XSBI to 10 Gbps serial interfacing, XAUI to XSBI interfacing, XAUI to XGMII interfacing. To provide XAUI to 10 Gbps serial interfacing, the control signal 34 is set to configure the 1$^{st}$ and 2$^{nd}$ switch modules 14 and 18 to couple the PMA module 12 to the PCS module 16 and the PCS module 16 to the XS module 20, respectively. In this configuration, the input module 56 and output module 58 are not used.

To provide XGMII to 10 Gbps serial interfacing, the 1$^{st}$ switch module 14 is configured to couple the PMA module 12 to the PCS module 16. The 2$^{nd}$ switch module 18 is configured to provide the alternate input parallel data 36 to the PCS module 16. In addition, the 2$^{nd}$ switch module 18 is configured to provide the PCS parallel inbound data 44 as the alternate output parallel data 50 to output module 58. In this mode, the XS module 20 is disabled.

To provide XSBI to 10 Gbps serial interfacing, the 2$^{nd}$ switching module is disabled. The 1$^{st}$ switching module is operably coupled to provide the alternate input parallel data 36 as the PMA parallel outbound data 30 to PMA module 12. In addition, the 1$^{st}$ switch module 14 provides the PMA parallel inbound data 40 to the output module 58 as the alternate output parallel data 50. In this mode, the XS module 20 and the PCS module 16 are disabled.

To provide XAUI to XSBI interfacing, the 2$^{nd}$ switching module 18 is configured to couple the PCS module 16 to the XS module 20. The 1$^{st}$ switching module 14 is configured to provide the alternate input parallel data 36 as the PCS coded parallel inbound data 42 to the PCS module 16. In addition, the 1$^{st}$ switch module 14 is configured to provide the PCS coded parallel outbound data 28 to the output module 58 as the alternate output parallel data 50. In this mode, the PMA module 12 is disabled.

To provide XAUI to XGMII interfacing, the 1$^{st}$ switching module 14 is disabled. The 2$^{nd}$ switching module 18 is configured to provide the alternate input parallel data 36 as the XS parallel inbound data 46 to the XS module 20. The 2$^{nd}$ switch module 18 is also configured to provide the XS parallel outbound data 24 to the output module 58 as the alternate output parallel data 50. In this mode, the PMA module 12 and the PCS module 16 are disabled.

In addition, the 1$^{st}$ and 2$^{nd}$ switching modules may be configured to provide loop-back features for the XS module 20, the PCS module 16 and/or the PMA module 12. Such loop-back coupling allows for diagnostic testing and/or tapping of the modules 12, 16, and/or 20.

Figure 2:
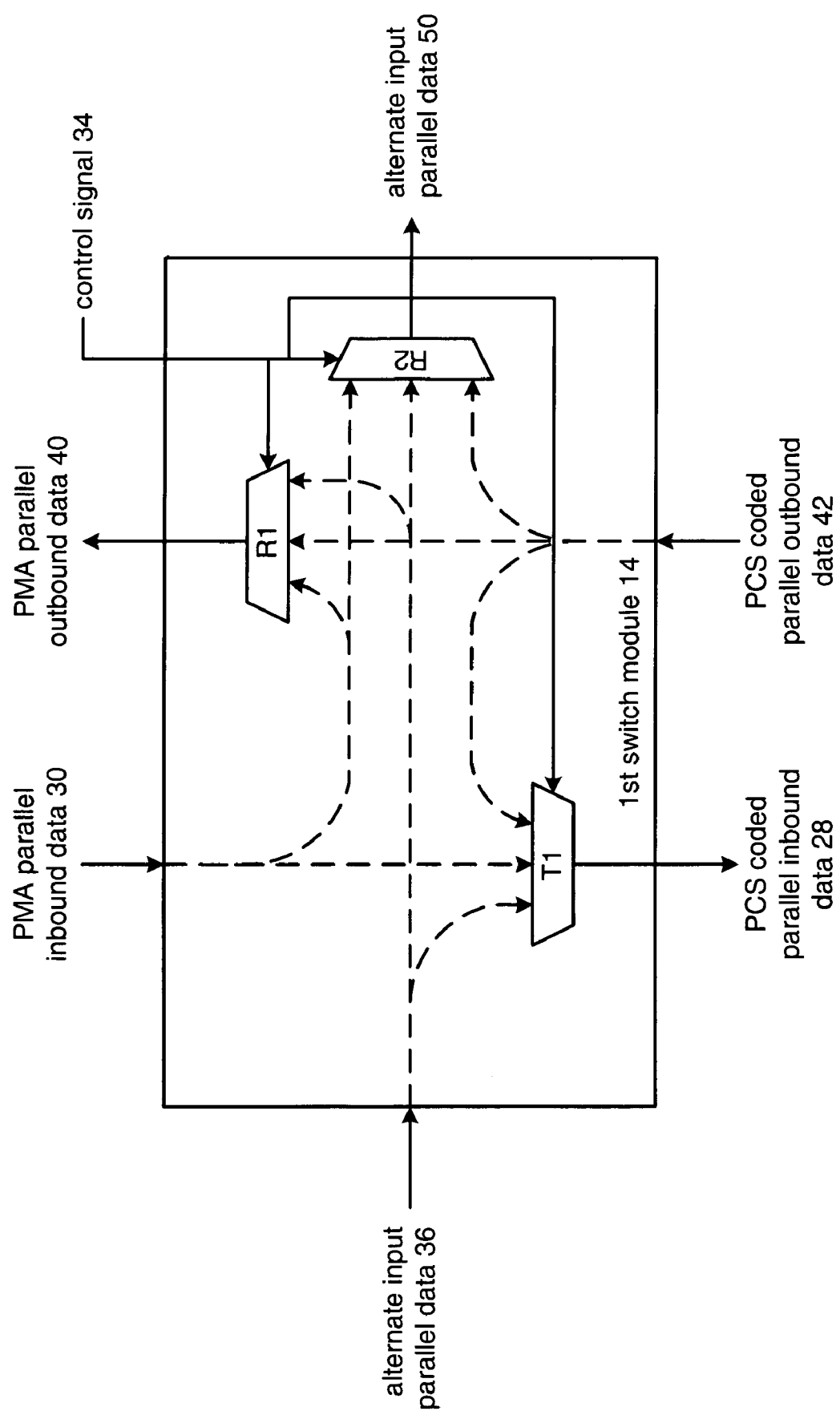
FIG. 2 is a schematic block diagram of a $1^{st}$ switching module in accordance with the present invention.

FIG. 2 illustrates a schematic block diagram of the 1$^{st}$ switch module 14. As shown, the 1$^{st}$ switch module 14 includes three multiplexers, T1, R1 and R2. All are controlled based on the control signal 34. The dash lines indicate the alternate configurations of the 1st switch module 14 to provide the various interfacing combinations described with reference to FIG. 1.

Figure 3:
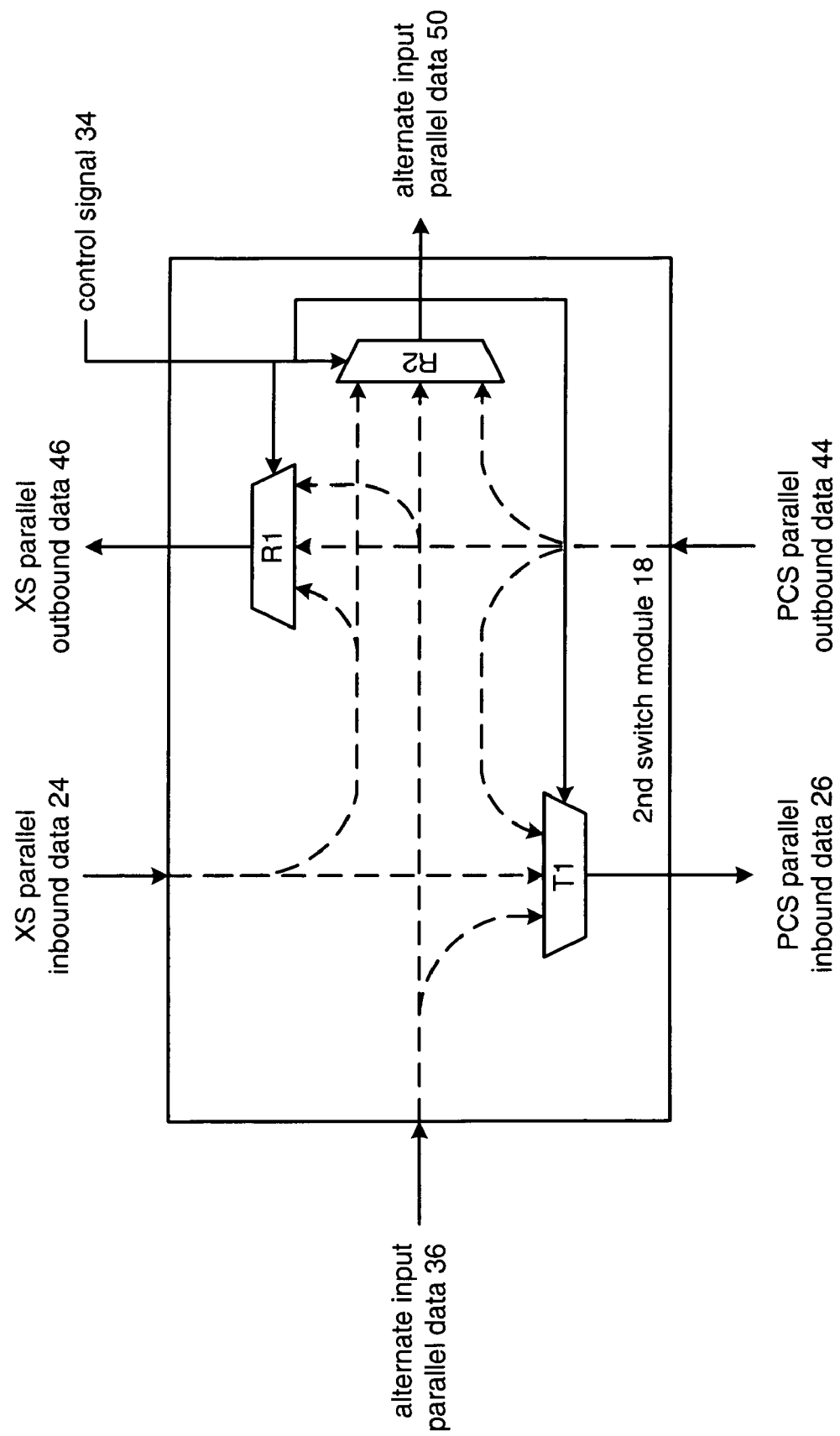
FIG. 3 is a schematic block diagram of a $2^{nd}$ switching module in accordance with the present invention.

FIG. 3 illustrates a schematic block diagram of the 2nd switch module 18 that also includes three multiplexers, T1, R1 and R2. The dash lines show the various switching combinations for the 2nd switch module 18 to provide the various interfacing combinations described with reference to FIG. 1.

FIG. 4 illustrates a schematic block diagram of the input module 56. As shown, the input module 56 includes pads to receive the input data 25 (which is formatted in accordance with XSBI or XGMII signaling), an on-chip termination, receivers, and a plurality of D flip-flops. The plurality of D flip-flops is clocked at various clock rates (clk 156 and 322) to achieve the proprietary formatting of the alternate input parallel data 36. The receivers may be configured per input signal receiver_select to receive the input data 25 in an LVDS (low voltage differential signaling) format or an HSTL (high-speed transceiver logic) format.

FIG. 5 illustrates a schematic block diagram of the output module 58 that includes a plurality of D flip-flops, multiplexers, drivers, and output pads. The plurality of D flip-flops is configured to received the alternate output parallel data 50 and is clocked at various clocking rates according to the proprietary formatting to produce clocked data. The multiplexers provide the clocked data to the drivers, which produce the output data 35 in an LVDS format or HSTL format based on a driver_select signal. The output data 35 may be formatted in accordance with XSBI or XGMII signaling.

Figure 6:
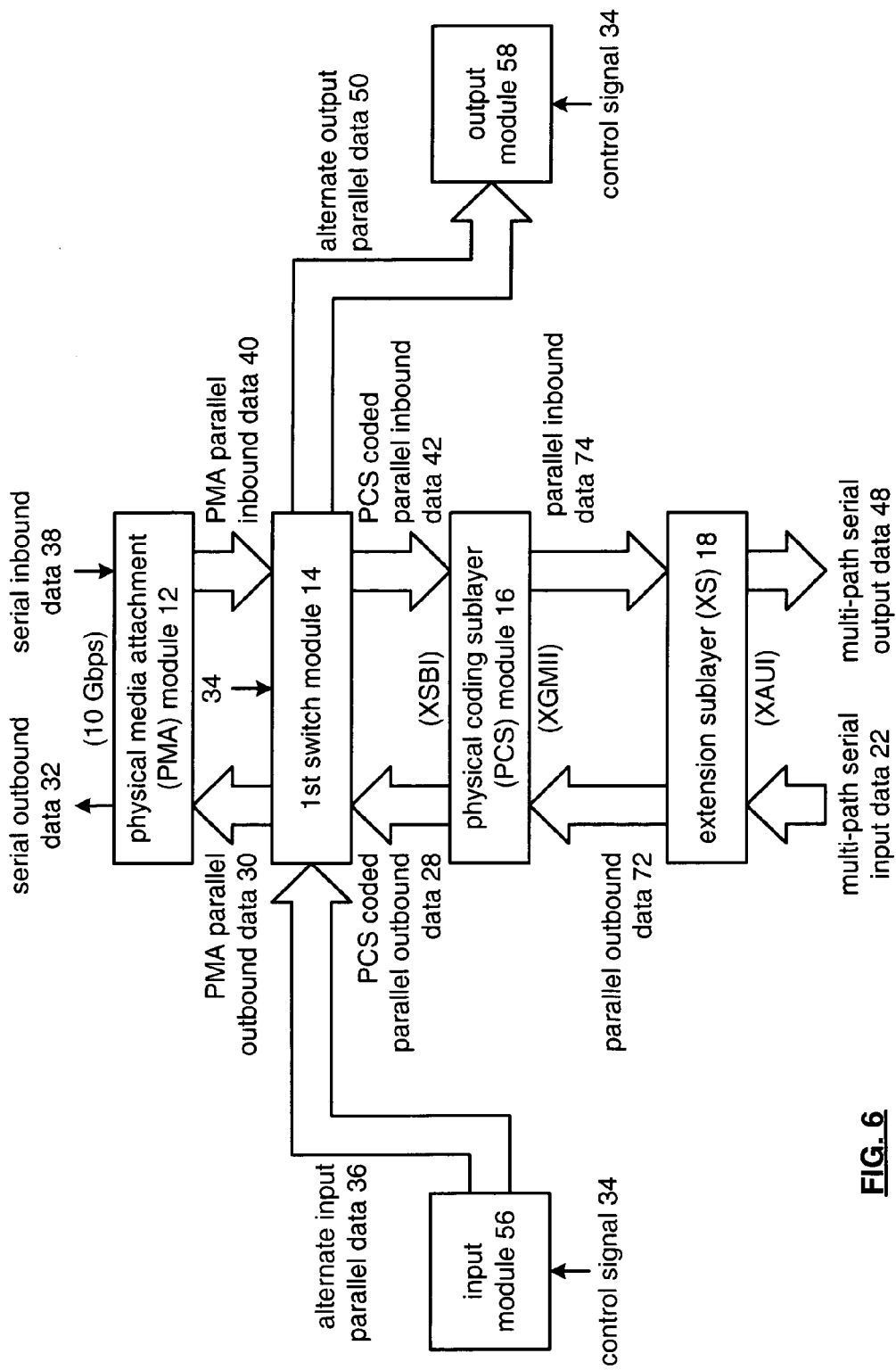
FIG. 6 is a schematic block diagram of an alternate embodiment of a programmable layered sub-system interface in accordance with the present invention.

FIG. 6 illustrates a programmable layered multi-system interface 70 that includes the PMA module 12, the 1st switch module 14, the PCS module 16, the XS module 20, input module 56 and output module 58. The functionality of the 1st switch module 14 is as described with reference to FIG. 1. As such, the 1st switch module 14 in combination with the input/output modules 56 and 58 provide various interfacing combinations of the programmable layered sub-system interface 70. In this embodiment, the programmable layered sub-system interface 70 may provide XAUI to 10 Gbps serial interfacing, XSBI to 10 Gbps serial interfacing, and XAUI to XSBI interfacing.

FIG. 7 illustrates a schematic block of another embodiment of the programmable layered sub-system interface 80. The interface 80 includes the PMA module 12, the PCS module 16, the 2nd switch module 18, the XS module 20, the input module 56 and the output module 58. The 2nd switch module 18 functions as previously described with reference to FIG. 1. In this configuration, the programmable layered sub-system interface 80 provides various interfacing combinations. For example, the interface 80 provides XAUI to 10 Gbps serial interfacing, XGMII to 10 Gbps serial interfacing, and XAUI to XGMII interfacing.

The preceding discussion has presented a programmable layered sub-system interface that allows a single device, or single integrated circuit, to provide interfacing for multiple applications. As one of average skill in the art will appreciate, other embodiments may be derived from the teachings of the present invention, without deviating from the scope of the claims.

What is claimed is:

1. A programmable layered subsystem interface comprising:
    extension sublayer (XS) module operably coupled to convert multi-path serial input data into XS parallel outbound data and to convert XS parallel inbound data into multi-path serial output data;
    physical coding sublayer (PCS) module operably coupled to perform sublayer encoding on the PCS parallel outbound data to produce PCS coded parallel outbound data and to perform sublayer decoding on PCS coded parallel inbound data to produce PCS parallel inbound data;
    physical media attachment (PMA) module operably coupled to convert PMA parallel outbound data into serial outbound data and to convert serial inbound data into PMA parallel inbound data;
    input module operably coupled to provide alternate input parallel data;
    output module operably coupled to receive alternate output parallel data;
    first switch module operably coupled to provide either the alternate input parallel data or the PMA parallel inbound data as the PCS coded parallel inbound data to the PCS module in response to a control signal and to provide the PCS coded parallel outbound data to either the output module as the alternate output parallel data or to the PMA module as the PMA parallel outbound data in response to the control signal; and
    second switch module operably coupled to provide either the XS parallel outbound data or the alternative input parallel data as the PCS parallel outbound data to the PCS module in response to the control signal and to provide the PCS parallel inbound data to either the output module as the alternate output parallel data or to the XS module as the XS parallel inbound data in response to the control signal, wherein the alternate input parallel data, the PMA parallel inbound data, the PCS coded parallel inbound data, the PCS coded parallel outbound data, the alternate output parallel data, and the PMA parallel outbound data when switched via the first switch module is formatted in accordance with an XSBI parallel data format.

2. The programmable layered subsystem interface of claim 1, wherein the first switch module further functions to:
    provide the PMA parallel inbound data to the PMA module as the PMA parallel outbound data in response to the control signal; and
    provide the PCS coded parallel outbound data to the PCS module as the PCS coded parallel inbound data in response to the control signal.

3. The programmable layered subsystem interface of claim 1, wherein the first switch module further functions to:
    provide the alternate input parallel data to the output module as the alternate output parallel data in response to the control signal.

4. The programmable layered subsystem interface of claim 1, wherein the first switch module further functions to:
    provide the alternate input parallel data to the PMA module as the PMA parallel outbound data in response to the control signal; and
    provide the PMA parallel inbound data to the output module as the alternate output parallel data in response to the control signal.

5. The programmable layered subsystem interface of claim 1, wherein the XS module further comprises:
    serial/deserial interface (XAUI) module operably coupled to convert the multi-path serial input data into XAUI parallel outbound data and to convert XAUI parallel inbound data into the multi-path serial output data;
    second physical coding sublayer (PCS) module operably coupled to perform sublayer encoding on the XAUI parallel outbound data to produce the XS parallel outbound data and to perform sublayer decoding on XAUI coded parallel inbound data to produce the XS parallel inbound data.

6. The programmable layered subsystem interface of claim 1, wherein the second switch module further functions to:
provide the XS parallel outbound data to the XS module as the XS parallel inbound data in response to the control signal; and
provide the PCS coded parallel inbound data to the PCS module as the PCS coded parallel outbound data in response to the control signal.

7. The programmable layered subsystem interface of claim 1, wherein the second switch module further functions to:
provide the alternate input parallel data to the output module as the alternate output parallel data in response to the control signal.

8. The programmable layered subsystem interface of claim 1, wherein the second switch module further functions to:
provide the alternate input parallel data to the XS module as the XS parallel inbound data in response to the control signal; and
provide the XS parallel outbound data to the output module as the alternate output parallel data in response to the second control signal.

9. The programmable layered subsystem interface of claim 1, wherein the XS parallel outbound data, the alternative input parallel data, the PCS parallel outbound data, the PCS parallel inbound data, the alternate output parallel data, and the XS parallel inbound data when switched via the second switch module are formatted in accordance with an XGMII data format.

10. The programmable layered subsystem interface of claim 1, wherein the input module further comprises:
logic circuitry to process the alternate input parallel data as either low voltage differential signaling (LVDS) signals or as HSTL signals.

11. The programmable layered subsystem interface of claim 1, wherein the output module further comprises:
logic circuitry to process the alternate output parallel data as either low voltage differential signaling (LVDS) signals or as HSTL signals.

12. A programmable layered subsystem interface comprising:
extension sublayer (XS) module operably coupled to convert multi-path serial input data into parallel outbound data and to convert parallel inbound data into multi-path serial output data;
physical coding sublayer (PCS) module operably coupled to perform sublayer encoding on the parallel outbound data to produce PCS coded parallel outbound data and to perform sublayer decoding on PCS coded parallel inbound data to produce the parallel inbound data;
physical media attachment (PMA) module operably coupled to convert PMA parallel outbound data into serial outbound data and to convert serial inbound data into PMA parallel inbound data;
input module operably coupled to provide alternate input parallel data;
output module operably coupled to receive alternate output parallel data; and
switch module operably coupled to provide either the alternate input parallel data or the PMA parallel inbound data as the PCS coded parallel inbound data to the PCS module in response to a control signal and to provide the PCS coded parallel outbound data to either the output module as the alternate output parallel data or to the PMA module as the PMA parallel outbound data in response to the control signal, wherein the alternate input parallel data, the PMA parallel inbound data, the PCS coded parallel inbound data, the PCS coded parallel outbound data, the alternate output parallel data, and the PMA parallel outbound data, when switched via the switch module, are formatted in accordance with an XSBI parallel data format.

13. The programmable layered subsystem interface of claim 12, wherein the switch module further functions to:
provide the PMA parallel inbound data to the PMA module as the PMA parallel outbound data in response to the control signal; and
provide the PCS coded parallel outbound data to the PCS module as the PCS coded parallel inbound data in response to the control signal.

14. The programmable layered subsystem interface of claim 12, wherein the switch module further functions to:
provide the alternate input parallel data to the output module as the alternate output parallel data in response to the control signal.

15. The programmable layered subsystem interface of claim 12, wherein the switch module further functions to:
provide the alternate input parallel data to the PMA module as the PMA parallel outbound data in response to the control signal; and
provide the PMA parallel inbound data to the output module as the alternate output parallel data in response to the control signal.

16. The programmable layered subsystem interface of claim 12, wherein the XS module further comprises:
serial/deserial interface (XAUI) module operably coupled to convert the multi-path serial input data into XAUI parallel outbound data and to convert XAUI parallel inbound data into the multi-path serial output data;
second physical coding sublayer (PCS) module operably coupled to perform sublayer encoding on the XAUI parallel outbound data to produce the XS parallel outbound data and to perform sublayer decoding on XAUI coded parallel inbound data to produce the XS parallel inbound data.

17. The programmable layered subsystem interface of claim 12, wherein the input module further comprises:
logic circuitry to process the alternate input parallel data as either low voltage differential signaling (LVDS) signals or as HSTL signals.

18. The programmable layered subsystem interface of claim 12, wherein the output module further comprises:
logic circuitry to process the alternate output parallel data as either low voltage differential signaling (LVDS) signals or as HSTL signals.

19. A programmable layered subsystem interface comprising:
extension sublayer (XS) module operably coupled to convert multi-path serial input data into XS parallel outbound data and to convert XS parallel inbound data into multi-path serial output data;
physical coding sublayer (PCS) module operably coupled to perform sublayer encoding on the PCS parallel outbound data to produce coded parallel outbound data and to perform sublayer decoding on coded parallel inbound data to produce PCS parallel inbound data;
physical media attachment (PMA) module operably coupled to convert the coded parallel outbound data into serial outbound data and to convert serial inbound data into the coded parallel inbound data;

input module operably coupled to provide alternate input parallel data;

output module operably coupled to receive alternate output parallel data; and switch module operably coupled to provide either the XS parallel outbound data or the alternative input parallel data as the PCS parallel outbound data to the PCS module in response to a control signal and to provide the PCS parallel inbound data to either the output module as the alternate output parallel data or to the XS module as the XS parallel inbound data in response to the control signal, wherein the XS parallel outbound data, the alternative input parallel data, the PCS parallel outbound data, the PCS parallel inbound data, the alternate output parallel data, and the XS parallel inbound data when switched via the switch module are formatted in accordance with an XGMII data format.

20. The programmable layered subsystem interface of claim 19, wherein the XS module further comprises:

serial/deserial interface (XAUI) module operably coupled to convert the multi-path serial input data into XAUI parallel outbound data and to convert XAUI parallel inbound data into the multi-path serial output data;

second physical coding sublayer (PCS) module operably coupled to perform sublayer encoding on the XAUI parallel outbound data to produce the XS parallel outbound data and to perform sublayer decoding on XAUI coded parallel inbound data to produce the XS parallel inbound data.

21. The programmable layered subsystem interface of claim 19, wherein the switch module further functions to:

provide the XS parallel outbound data to the XS module as the XS parallel inbound data in response to the control signal; and provide the PCS coded parallel inbound data to the PCS module as the PCS coded parallel outbound data in response to the control signal.

22. The programmable layered subsystem interface of claim 19, wherein the switch module further functions to:

provide the alternate input parallel data to the output module as the alternate output parallel data in response to the control signal.

23. The programmable layered subsystem interface of claim 19, wherein the second switch module further functions to:

provide the alternate input parallel data to the XS module as the XS parallel inbound data in response to the control signal; and provide the XS parallel outbound data to the output module as the alternate output parallel data in response to the control signal.

24. The programmable layered subsystem interface of claim 19, wherein the input module further comprises:

logic circuitry to process the alternate input parallel data as either low voltage differential signaling (LVDS) signals or as HSTL signals.

25. The programmable layered subsystem interface of claim 19, wherein the output module further comprises:

logic circuitry to process the alternate output parallel data as either low voltage differential signaling (LVDS) signals or as HSTL signals.

\* \* \* \* \*